United States Patent [19]
Mitsui et al.

[11] Patent Number: 5,626,979
[45] Date of Patent: May 6, 1997

[54] BATTERY DEVICE AND ELECTRONIC EQUIPMENT EMPLOYING THE BATTERY DEVICE AS POWER SOURCE

[75] Inventors: Hidero Mitsui; Toshitaka Takei, both of Kanagawa; Hisashi Aoki, Aichi; Masahito Kishi; Koji Yaginuma, both of Kanagawa, all of Japan

[73] Assignee: Sony Corporation, Japan

[21] Appl. No.: 415,457

[22] Filed: Apr. 3, 1995

[30] Foreign Application Priority Data

Apr. 8, 1994 [JP] Japan ..................... 6-070363
Apr. 15, 1994 [JP] Japan ..................... 6-076828

[51] Int. Cl.$^6$ .............. H01M 2/02; H01M 2/20
[52] U.S. Cl. .............. 429/97; 429/99; 429/100; 429/123; 362/9
[58] Field of Search .............. 429/1, 90, 96–97, 429/99–100, 123; 362/9

[56] References Cited

U.S. PATENT DOCUMENTS

| | | | |
|---|---|---|---|
| 5,227,263 | 7/1993 | Blier | 429/99 |
| 5,415,947 | 5/1995 | Mitsui et al. | 429/90 X |
| 5,415,955 | 5/1995 | Kobayashi et al. | 429/97 |
| 5,437,938 | 8/1995 | Mitsui et al. | 429/96 X |

FOREIGN PATENT DOCUMENTS

| | | |
|---|---|---|
| 0572327 | 1/1993 | European Pat. Off. |
| 0559573 | 8/1993 | European Pat. Off. |
| 6037874 | 2/1994 | Japan. |

Primary Examiner—Donald R. Valentine
Attorney, Agent, or Firm—Ronald P. Kananen

[57] ABSTRACT

A battery pack housing four tubular cells in juxtaposition to each other in vertical and transverse directions. The battery pack has a cell housing unit, a plurality of cells housed within said cell housing unit, first and second grooves formed on both lateral surfaces of the cell housing unit extending parallel to the direction of insertion of the housing unit into an electronic device, at a mid height along the height of the cell housing unit, and a third groove formed at a mid position along the width of the housing unit extending from the forward end face as far as a mid portion of the housing unit. The first and second grooves are opened in a forward end face of the housing unit in the direction of insertion. The battery device also has a hole formed in a portion of the forward end face of the housing unit not faced by the end faces of the cells housed within the housing unit. An electronic device in which the battery device is loaded has a battery loading section dimensioned to hold the battery device. The battery loading section has, on its opposite inner surfaces, first and second ribs engaged by the first and second grooves in the battery pack and a third rib engaged by the third groove of the battery pack. The battery loading device also has an engagement boss on an end face of the battery loading section lying in the inserting direction of the battery pack. The engagement boss is engaged in a hole formed in the forward end face of the housing unit of the battery pack. In the electronic equipment, a battery pack housing four cells and a battery pack housing two cells is loaded at a selectively set loading position.

19 Claims, 17 Drawing Sheets

BATTERY DEVICE AND ELECTRONIC EQUIPMENT EMPLOYING THE BATTERY DEVICE AS POWER SOURCE

BACKGROUND OF THE INVENTION

This invention relates to a battery device having a chargeable secondary cell or a primary cell such as a dry cell in its housing member, and an electronic equipment such as a video camera or a video tape recorder employing the battery device as a power source.

In a portable electronic device, such as a video camera, video tape recorder, tape player or a disc player, a dc power source such as a rechargeable battery or a dry cell is adapted to be used in addition to a commercial power source supplied via a dc adapter.

With the battery, a battery loading unit is mounted at a portion of a main body of the device, and a battery housing a rechargeable cell or a dry cell is loaded on the battery loading unit. The battery having the rechargeable cell enclosed therein is loaded on a charger having a dc adapter for charging.

The battery pack employed in an electronic device such as a video camera or a video tape recorder has a housing unit for housing plural batteries in order to procure a voltage sufficient to drive the electronic device or a capacity sufficient to drive the electronic device for longer than a preset time period. This type of the battery device has a housing unit having two rechargeable cells arrayed side-by-side therein.

The battery pack 2, having two cylindrically-shaped rechargeable cells 1, 1, has a housing unit 4 having a cell housing section 3 having a size sufficient to hold two rechargeable cells 1, 1, side-by-side therein, as shown in FIG. 26. The housing unit 4 is molded of synthetic resin and is adapted to hold cells 1, 1 arranged side-by-side in the cell housing unit 3 in a hermetically sealed condition, as shown in FIG. 27. The two cells 1, 1, housed within the housing unit 4, are connected in series with each other via an electrode plate, not shown, in the cell housing unit 3.

The bottom side of the housing unit 4, housing the two cells 1 side-by-side in the cell housing unit 3, is integrally formed with a terminal connecting plate 7 having embedded therein a positive terminal plate 5 and a negative terminal plate 6 electrically connected to a connection terminal of an electronic device on which is loaded the battery pack 2, and having a connection line, not shown, electrically connecting the positive and negative terminals 5 and 6 to the electrode plate 7. The positive terminal 5 and the negative terminal 6, provided on the terminal mounting plate 7, are adapted to be electrically connected to a pin-shaped connection terminal provided on the electronic device on which the battery pack 2 is loaded. The tubular-shaped positive and negative terminals 5, 6 are mounted on both sides of the terminal mounting plate 7 for facing an end face 8 which is the loading side of the battery pack 2 into the electronic device, as shown in FIG. 28.

The tubular-shaped positive and negative terminals 5 and 6 are mounted at both ends of the terminal mounting plate 7 with opening ends 5a, 6a thereof facing the end face of the battery device 2 along the loading direction of the electronic device.

The above-described battery pack 2 is substantially rectangular in shape conforming to the outer shape of the two cells 1, 1 arranged side-by-side. Both sides of an upper surface 9 of the housing unit 4 are formed as arcuate portions 10, 10 conforming to the outer peripheral surface of the cells 1, 1. The battery pack 2 thus formed with the arcuate portions 10, 10 on its upper surface is vertically non-symmetrical in shape so that its vertical orientation can be discerned easily.

The above-described battery pack 2 may be loaded so as to be housed within a battery loading section 14 formed in a portion of an outer casing 13 of a video camera 12, as shown in FIG. 29. That is, the battery hosing unit 14 having a size sufficient to hold the battery pack 2 in its entirety is formed as part of of an outer casing 13. The battery loading section 14 is formed by partitioning a portion of the outer casing 13 and has a pair of connecting pins 17, 18 on its inner wall surface facing an opening 15 for the insertion or removal of the battery pack 14. The connecting pins 17, 18 are adapted to be respectively connected to the positive terminal 5 and the negative terminal 8 provided on the battery pack 2.

The battery pack 2 is loaded in the battery loading section 14 by being inserted in a direction shown by arrow A in FIG. 29 via an opening 15, with the end face 8 on which the opening ends 5a 6a of the positive terminal 5 and the negative terminal 6 are opened. At this time, the positive terminal 5 and the negative terminal 6 are connected to the connecting pins 17, 18 and the battery pack 2 is electrically connected to the video camera 12 so that the power of the cells 1, i may be fed to the video camera 12.

The housing unit 4 of the battery pack 2 has a groove 11 in its upper surface 9 for ensuring that the battery pack 2 is inserted into the battery loading section 14, as shown with the proper orientation in FIGS. 26 and 27. The groove 11 is open at 11a in the inserting side end face 8 of the battery pack 2 and is formed parallel to the loading direction with respect to the battery loading section 14. On the inner lateral surface of the battery loading section 14 is formed a rib 19 for extending from the opening 15 as far as its mid portion so as to be engaged in the groove 11. By providing the groove 11 in the battery pack 2 and by providing the rib 19 which engages the groove 11 in the battery loading section 14, the battery pack 2 can be loaded in the battery loading section 14 only when the battery pack is loaded with the rib 19 in proper registration with the groove 11, thus inhibiting mistaken insertion of the battery device into the battery loading section 14.

There is also proposed a second battery pack 22 having a housing unit 4 further housing a second row of two series connected cells 1 and thus housing four cells 1, as shown in FIG. 30. With the second battery pack 22, the first row of two juxtaposed cells 1, 1 stacked on the second row of two juxtaposed cells 1, 1, are housed in their entirety in the housing unit 24, as shown in FIG. 31. With the second battery pack 22 having the two by two cells arranged side-by-side in the housing unit 4 the construction of the terminal mounting plate 7 is the same as the first battery pack 2 housing the two cells 1, 1, in which the positive terminal 5 and the negative terminal 6 are embedded in the terminal mounting plate 7 and connected to the connecting pins 17, 18 provided on the video camera 12. Since the second battery pack 22 shown in FIGS. 30 and 31 has a first row of two juxtaposed cells 1, 1 stacked on a second row of two juxtaposed cells 1, 1, the second battery device differs from the first battery 2 only with respect to height $H_1$. The width $W_1$ is the same as the first battery pack 2, with the two battery packs being substantially similar in shape to each other. Since the two battery packs are substantially similar in shape to each other, the groove 11 for preventing mistaken insertion into the battery loading section 14 may be of the same constitution for both the first and second battery packs 2 and 22.

In addition, since the second battery packs 22 houses within the housing unit 24 two cells 1, 1 arranged in two rows, the cell housing efficiency may be improved to reduce the size of the device 22 so that the battery loading section 14 of the electronic device on which the battery pack 22 is loaded may also be reduced in size.

Meanwhile, it is desirable that the first battery pack 2 housing two cells 1 and the second battery device 22 housing the four cells 1 be selectively loadable on a common electronic device. For example, if the video camera 12 is employed for a prolonged time or a shorter time, it is desirable to load the second battery pack 22 housing the four cells or to load the first battery pack 2 housing two cells, respectively.

For such selective loading of the first battery pack 2 housing the two cells 1 or the second battery pack 2 housing the four cells 1, it is necessary to design the battery loading section 14 having a size sufficient to hold the large-sized second battery pack 22 in its entirety, as shown in FIG. 32.

The second battery pack 22 houses the two side-by-side cells stacked on two other side-by-side cells, with the four cells being cylindrical in shape and of the same size and with an end face 28 thereof being substantially square, as shown in FIG. 31. Thus a diagonal line $S_1$ of the end face 28 is substantially equal to a width $W_1$ of the first battery pack 2. Thus, in or attempted to load a battery loading section 25 capable of loading the large-sized second battery pack 22 with the small-sized first battery pack 2, the first battery pack 2 can be loaded not only in the normal loading position in which it is inserted with the terminal mounting plate 7 in contact with the bottom surface 25a of the battery loading section 25 and with the positive terminal 5 and the negative terminal 6 being connected to the connection pins 17, 18 within the battery loading section 25, but also incorrectly in an inclined position along the diagonal direction of the battery loading section 25, as shown with a chain-dotted line and double-dotted chain line in FIG. 33. In addition, the first battery pack 2 can be loaded with its upper surface 9 extending along the upper surface 25b of the battery loading section 25, as indicated by a broken line in FIG. 33. If the first battery pack 2 is loaded with a tilt relative to the battery loading section 25 or with an offset towards the upper surface 25b, the positive and negative terminals 5, 6 cannot be connected to the connecting pins 17, 18 of the battery loading section 25, as a result of which the first battery pack 2 is incorrectly loaded and electrical connection cannot be established with the video camera.

On the other hand, since the cells in the battery pack are heavier than the components making up the electrical device, the battery pack housing the cells is relatively heavy. The battery pack having plural cells housed within a housing unit is increased in weight depending on the number of the cells housed therein. It thus becomes important to load the battery pack housing plural cells and having an increased weight on the battery loading section with correct positioning and orientation. If the battery pack having a large weight is loaded in the battery loading section without correct positioning and oscillates in the electronic device in which it is loaded, a large impact may be applied to the electronic device in which the battery pack is loaded, thus causing the risk that the electronic device is occasionally damaged. Above all, the connection terminals interconnecting the battery pack and the electronic device may be easily damaged by such impact.

OBJECT AND SUMMARY OF THE INVENTION

It is therefore an object of the present invention to provide a battery pack which can be loaded with correct positioning on an electronic device to assure sufficient protection of the electronic device.

It is another object of the present invention to provide a battery pack which can be loaded reliably without the risk of mistaken insertion in a battery loading section of an electronic device capable of selectively loading battery packs housing a different number of cells and having different sizes.

It is a further object of the present invention to provide a battery pack which can be loaded with correct positioning in a battery loading section capable of selectively loading battery packs having different sizes.

It is a further object of the present invention to provide a battery pack capable of protecting connection terminals for interconnection and assuring safe and reliable interconnection of the connection terminals.

It is a further object of the present invention to provide an electronic device having a battery loading section capable of selectively loading battery packs having different sizes.

It is a further object of the present invention to provide an electronic device capable of protecting the battery pack and the connection terminals for interconnection provided in the battery loading section and assuring safe and reliable loading and unloading of the battery pack.

In one aspect, the present invention provides a battery pack having a housing unit with a cell housing unit, a plurality of cells housed within the cell housing unit, and first and second grooves formed on both lateral surfaces of the cell housing unit extending parallel to the direction of insertion of the housing unit into an electronic device at a mid height along the height of the cell housing unit at right angles to the direction of insertion. The first and second grooves have open ends in their forward end faces in the direction of insertion.

The battery pack also includes a third groove on a surface extending at right angles to the forward end face and opposite lateral sides of the housing unit at a mid position along the width of the housing unit. The third groove is open in the forward end face of the housing unit and extends from the forward end face as far as a mid portion of the housing unit.

The battery pack also includes a hole formed in a portion of the forward end face of the housing unit along the direction of insertion not faced by the end faces of the cells housed within the housing unit.

The housing unit is dimensioned to hold two by two juxtaposed tubular cells in parallel in vertical and transverse directions.

With the battery pack in which the housing unit holds two by two juxtaposed tubular cells in two rows in two tiers, the first, second and third grooves are formed in spaces defined in the cell housing unit between the cells arranged in juxtaposition and parallel to each other.

With the battery pack according to the present invention, connection terminals electrically connected to connection terminals provided on the electronic device are provided on the forward end face of the housing unit in the direction of insertion into the electronic device.

In another aspect, the present invention provides an electronic device having a main body having a battery loading section dimensioned to hold therein a battery pack having a cell housing section holding four juxtaposed tubular cells in two rows in two tiers. First and second ribs are formed on opposite inner lateral sides of the battery loading section for engagement by the first and second grooves of the battery pack.

A third rib is formed on a surface of the battery loading section extending at right angles to the opposite lateral sides of the battery loading section and in parallel with the direction of insertion of the battery pack. The third rib is engaged in a third groove formed in a surface of the housing unit of the battery pack extending at right angles to both lateral sides of the housing unit in parallel with the direction of insertion into the battery loading section.

An engagement boss engaged in a hole formed in the forward end face of the housing unit of the battery pack on an end face of the battery loading section lying in the inserting direction of the battery pack.

Connection terminals electrically connected to connection terminals provided on the forward end face of the battery pack are formed on the end face of the battery loading section facing the inserting direction of the battery pack.

The connection terminals provided on the battery pack and the battery loading section are connection pins and tubular connection terminals engaged by the connection pins.

The engagement boss engaged in the hole formed in the battery pack is longer in length than the connection pins or the tubular connection terminals provided in the battery pack or in the battery loading section.

The battery pack according to the present invention is loaded in position in the battery loading section by engagement of the first and second grooves formed in the housing unit with the ribs provided in the battery loading section.

The battery pack having the first and second grooves closed on rear end faces in the direction of insertion can be loaded in the battery loading section only when the forward end in the direction of insertion is the inserting end. The battery pack cannot be inserted when it is about to be inserted in the opposite direction since a portion of the opposite end face is then abutted against the rib formed on the battery pack. On the other hand, the battery pack cannot be inserted in the vertically topsy-turvied state if a rib engaging in the third groove formed in the housing unit is formed in the battery loading section.

The battery pack having a hole extending parallel to the direction of insertion on the portion of the forward end face of the housing unit not faced by the end faces of the cells housed in the cell housing section may be loaded in position in the battery loading section by providing an engagement boss in the battery loading section so as to be engaged in the hole. Since the hole engaged by the engagement boss acts as an insertion guide during loading of the battery pack in the battery loading section, there is no necessity that the outer surface of the housing unit act as an insertion guide so that there is no risk of scratches being formed on the outer surface of the housing unit.

When the battery pack having four tubular cells housed within the cell housing unit with the cells neighboring to each other in two rows in two tiers, the first and second grooves formed in the battery pack are engaged by first and second ribs formed on the inner lateral sides of the battery loading section. The battery pack may be loaded in position on the electronic device by inserting the battery pack with the ribs acting as the guide and by engaging the ribs in the first and second grooves.

When the battery pack having four cells is loaded, the third groove formed in the battery pack is engaged by the third rib. If it is attempted to insert the battery pack holding four cells in a vertically topsy-turvied state, the third rib is abutted against a portion of the forward end face of the housing unit thereby prohibiting mistaken insertion.

If the battery pack holding four cells is inserted into the battery loading section of the electronic device from a forward end face having the hole, the connection terminals on the battery pack are engaged with the connection terminals on the electronic device for establishing electrical connection. Since the engagement boss engaged in the hole formed in the battery pack is longer in length than the connection pins or the tubular connection terminals provided in the battery pack or in the battery loading section, the connection pins and the connection terminals are interconnected only after the engagement boss is correctly engaged in the hole for positioning the battery pack with respect to the battery loading section.

In addition, if the battery pack is inserted into the battery loading section with the planar end face thereof opposite to the end face having the hole, the planar end face is caused to bear against the engagement boss provided in the battery loading section for inhibiting further insertion of the battery device for inhibiting mistaken insertion.

DETAILED DESCRIPTION OF THE PREFERRED EMBODIMENTS

Figure 1:
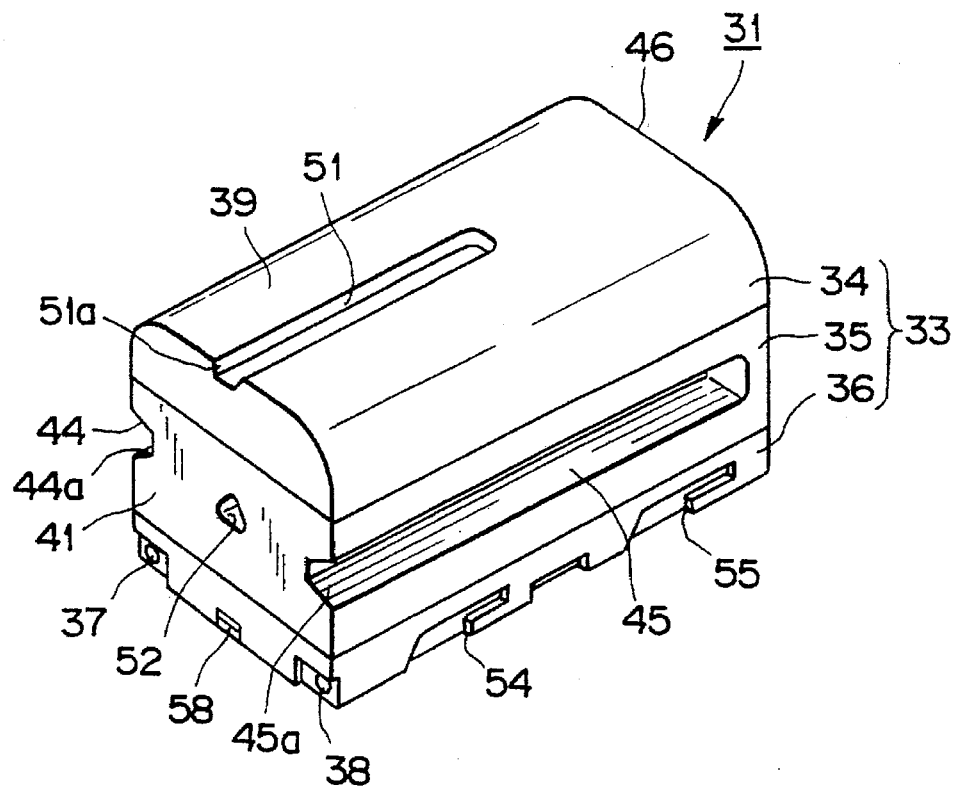
FIG. 1 is a perspective view showing a battery device according to the present invention.

Referring to the drawings, illustrative embodiments of a battery pack according to the present invention and an electronic device on which the battery pack is loaded will be explained in detail.

Figure 2:
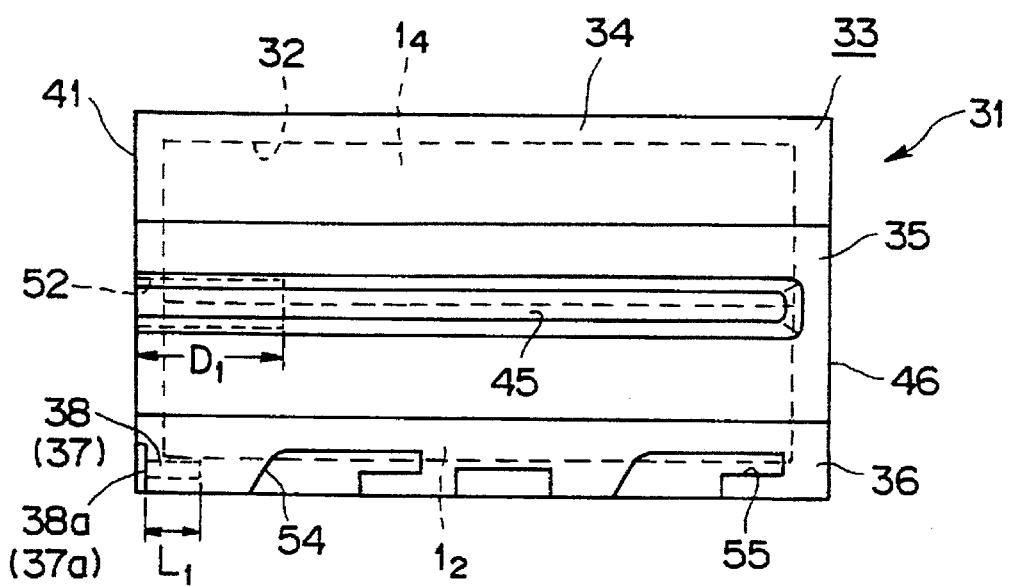
FIG. 2 is a side view showing a battery pack according to the present invention.
Figure 3:
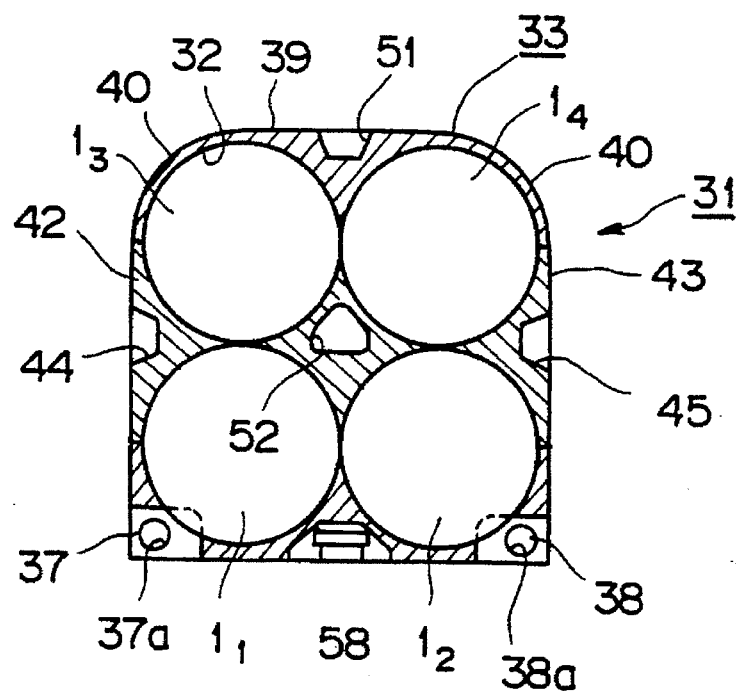
FIG. 3 is a transverse cross-sectional view according to the present invention.

A battery pack 31 of the present embodiment houses four cylindrically-shaped rechargeable cells 1. The battery pack 31 includes a housing unit 33 comprising a cell housing section 32 having a size sufficient to accommodate four cells 1 in a vertically and transversely juxtaposed state therein as shown in FIGS. 1, 2 and 3. The housing unit 33 is made up of an upper casing half 34, a mid casing half 35 and a terminal mounting plate 36. The terminal mounting plate 36 constitutes a bottom plate of the housing unit 33 and has embedded therein a positive electrode terminal 37 and a negative electrode terminal 38 electrically connected to connection terminals of an electronic device on which the battery pack 2 is loaded. The upper casing half 34, mid casing half 35 and the terminal mounting plate 36 are molded separately from an electrically insulating synthetic resin and abutted and coupled to one another. The cell housing section 32 of the housing unit 33 defining therein a space sufficient to hold the four cells 1 is constructed by the upper casing half 34, the mid casing half 35 and the terminal mounting plate 36 being abutted and coupled to one another.

The four cells 1 are housed within the cell housing section 32 by being arrayed in juxtaposition to each other in the vertical and transverse directions, as shown in FIGS. 2 and 3. The upper casing half 34, mid casing half 35 and the terminal mounting plate 36 have respective abutment surfaces thereof bonded or fused to one another with the four cells 1 contained therein for making up the housing unit 33.

The terminal mounting plate 36 constituting the bottom plate of the housing unit 33 has embedded therein the positive terminal 37 and the negative terminal 38 electrically connected to the connection terminals of the electronic device in which the battery pack 31 of the present embodiment is loaded. The terminal mounting plate also has a jumper wire, not shown, for electrically connecting the positive and negative terminals 37, 38, and electrode plates. The positive terminal 37 and the negative terminal 38 provided on the terminal mounting plate 36 are formed as tubes so that pin-shaped connection terminals provided on the electronic device in which the battery pack 31 is loaded may be inserted therein so as to be electrically connected thereto as shown in FIGS. 1 and 2. The positive terminal 37 and the negative terminal 38 in the form of tubes are mounted on both sides of an end face of the terminal mounting plate 36 with opening ends 37a, 38a being opened in an end face 41 of the battery pack 31 along the direction of inserting the battery pack 31 into the electronic device.

The above-described battery pack 31 is formed so as to be substantially parallelepipedic in conformity to the outer shape of the four cells 1 arranged in juxtaposition to each other in two rows in the vertical and transverse directions. Both sides of the upper casing half 34 constituting the upper side 39 of the housing unit 33 opposite to the bottom side integrally formed with the terminal mounting plate 86 are arcuate in profile in conformity to the outer periphery of the cells 1 contained in the cell housing unit 32. By the arcuate portions 40, 40 being formed on both sides of the upper surface 39, the battery pack 31 is non-symmetrical in shape in the vertical direction to permit easy discrimination of the up-and-down orientation of the battery pack.

The battery pack 31 of the embodiment illustrated has on both its lateral sides 42, 43 first and second grooves 44, 45 engaged by first and second ribs provided in the battery mounting section of an electronic device in which the battery pack 31 is loaded, as shown in FIGS. 1 and 2. The lateral sides 42 43 extend at right angles to the end face 41 on the side of insertion into the electronic device on which the opening ends 37a, 38a of the positive terminal 37 and the negative terminal 38 are opened. These first and second grooves 44, 45 are formed parallel to the direction of insertion of the battery pack 31 into the electronic device at a mid position in the vertical direction at right angles to the inserting direction of the housing unit 33 into the electronic device. The first and second grooves 44, 45 are formed for extending from the forward end face 41 in the inserting direction to a mid portion of the housing unit 33 so that opening ends 44a, 45a thereof are opened on the forward end face 41. Thus, the first and second grooves 44, 45 are formed in parallel with the inserting direction of the battery pack 31 so that the opposite ends thereof towards a rear end face 46 opposite to the end face 41 are closed.

Specifically, the first and second grooves 44, 45 are formed so that portions of the mid casing 35 constituting part of the housing unit 33 are extended towards a space defined between the set of cells. $1_1$, $1_3$ and $1_2$, $1_4$ arranged vertically in juxtaposition in the cell housing section 32, as shown in FIG. 3. Since the first and second grooves 44, 45 are formed in this manner between the cells $1_1$, $1_3$ and $1_2$, $1_4$ arranged vertically in juxtaposition to each other, the grooves 44, 45 are positioned at a mid position along the height of the housing unit 33 housing the four cells 1 arranged in juxtaposition and parallel to each other in the vertical and transverse directions.

In an upper wall section of the upper casing half 34 constituting the upper surface 39 of the housing unit 33 extending at right angles to the lateral surfaces 42, 43 and the forward end face 41 of the housing unit 33 is formed a third groove 51 engaged by a third rib provided in the battery loading section of the electronic device on which the battery pack 31 is loaded, as shown in FIG. 1. The third groove 51 is formed at a mid position along the width of the housing unit 33 parallel to the inserting direction from the end face 41 as far as a mid position of the housing unit 33 so that its opening end 51a is opened in the end face 41. That is, the third groove 51 has its end towards the rear end face of the housing unit 33 closed and is formed parallel to the inserting direction of the battery pack 31 into the electronic device. The third groove 51 plays the role of inhibiting mistaken insertion of the battery pack 31 into the battery loading section.

The forward end face 41 in the inserting direction of the housing unit 33 is formed with a hole 52 engaged by an engagement boss provided in the battery loading section of the electronic device in which the battery pack 31 is loaded, as shown in FIG. 1. The hole 52 is formed in the space not faced by any end faces of the four cells $1_1$ to $1_4$ arranged in juxtaposition to each other in the vertical and transverse directions in the cell housing section 32, that is in the space defined between the four cells $1_1$ to $1_4$ arranged in juxtaposition to each other in the vertical and transverse directions in the cell housing section 32. The hole 52 is formed extending from the end face 41 of the housing unit 33 inwardly into the interior of the battery pack 31.

Figure 4:
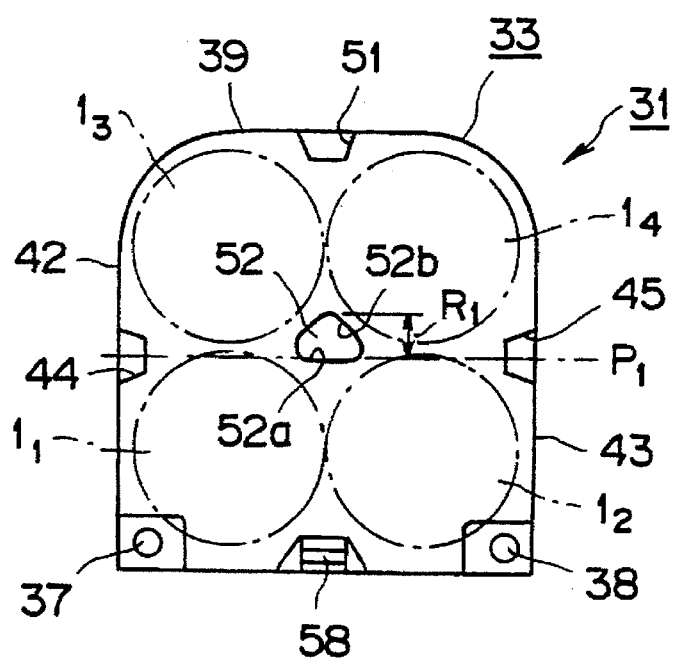
FIG. 4 is a front view of a battery pack according to the present invention.

The hole 52 may be of a substantially triangular cross-section, as shown in FIG. 3. The hole 52 is formed so that its lower side 52a is substantially coincident with a line $P_1$ interconnecting upper edges of the cells $1_1$, $1_2$ arranged on the bottom surface of the housing unit 33 and its apex 52b is intruded into a space between the cells $1_3$, $1_4$ arranged on the upper surfaces of the cells $1_1$, $1_2$ arranged on the bottom surface of the housing unit 33, as shown in FIG. 4. The hole 52 in a battery pack 22 holding four cells 1 is formed in order to permit the engagement boss engaged to be engaged in the groove 11 on the upper surface of the first battery pack 2 holding two cells 1 when the battery pack 2 is loaded in the battery loading section.

The hole 52 has its maximum diameter $R_1$ in the cross-sectional direction shallower than its depth $D_1$, as shown in FIGS. 2 and 4. That is, the hole 52 has it depth $D_1$ deeper than the radius $R_1$ of the opening end 52a. The reason therefor is that the engagement boss provided in the battery loading section for engagement in the hole 52 is of an elongated length in order to play the role of a guide for loading the battery device 31 in the battery loading section.

In addition, the hole 52 has its depth $D_1$ deeper than the length $L_1$ of the cylindrical positive and negative terminals 37 and 38 provided on the terminal mounting plate 36. The reason therefor is to enable the length of the engagement boss provided on the battery loading section for engagement in the hole 52 to be longer than the length of the connecting pins engaged with the positive and negative terminals 37, 38 as connecting terminals, so that the positive and negative terminals 37, 38 are engaged with the connecting pins after positioning the battery pack 31 with respect to the battery loading section.

Figure 5:
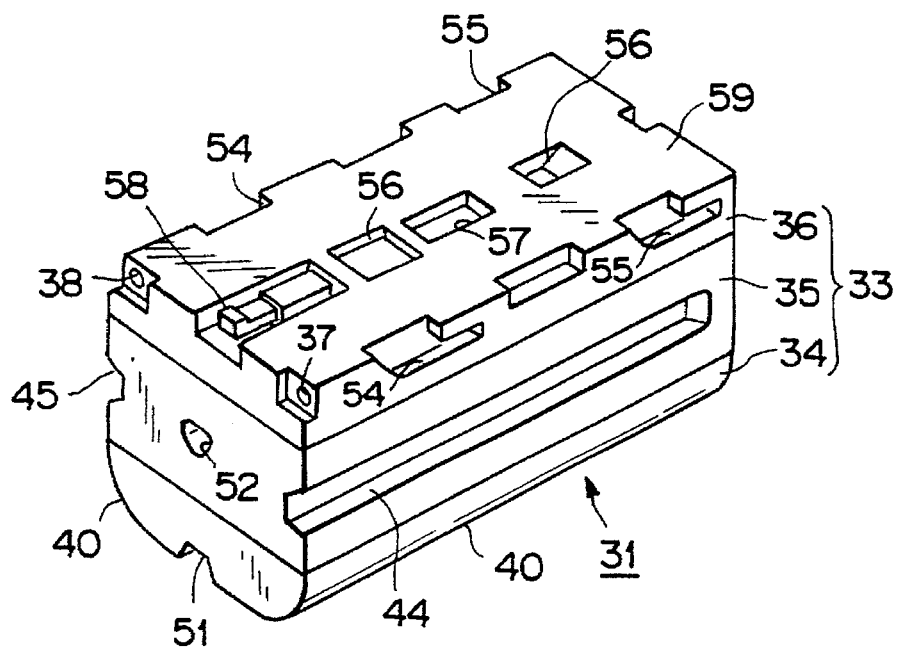
FIG. 5 is a perspective view of the battery device of the present invention, as viewed from the bottom side.

The battery pack 31 of the illustrated embodiment has, on both lateral sides of the terminal mounting plate 36 constituting the bottom plate of the housing unit 33, sets of engagement grooves 54, 55, engaged by engagement pieces, not shown, provided on an externally mounted type battery loading section, in order to permit the battery pack 31 to be loaded not only on the battery loading section provided within the electronic device but also on an externally mounted type battery loading section provided on the outer surface of the electronic device, as shown in FIGS. 1, 2 and 5. These engagement grooves 54, 55 are partially opened in the bottom surface of the housing unit 33 in the shape of a letter U, in order to be engaged by a sliding movement by L-shaped engagement pieces provided on the externally mounted battery loading unit, as shown in FIGS. 1 and 5. In the bottom surface 59 of the housing unit 33 are formed plural positioning holes 56, 57 engaged by elastically deformable engagement pieces and positioning protrusions provided on the bottom surface of the externally mounted battery loading section, as shown in FIG. 5. In the bottom surface of the housing unit 33 is formed a use state display window 58 which is moved by a movement member on the battery loading section when the battery device is loaded thereon for indicating that the housing unit has once been loaded and used on the battery loading section, as shown in FIG. 5.

Figure 6:
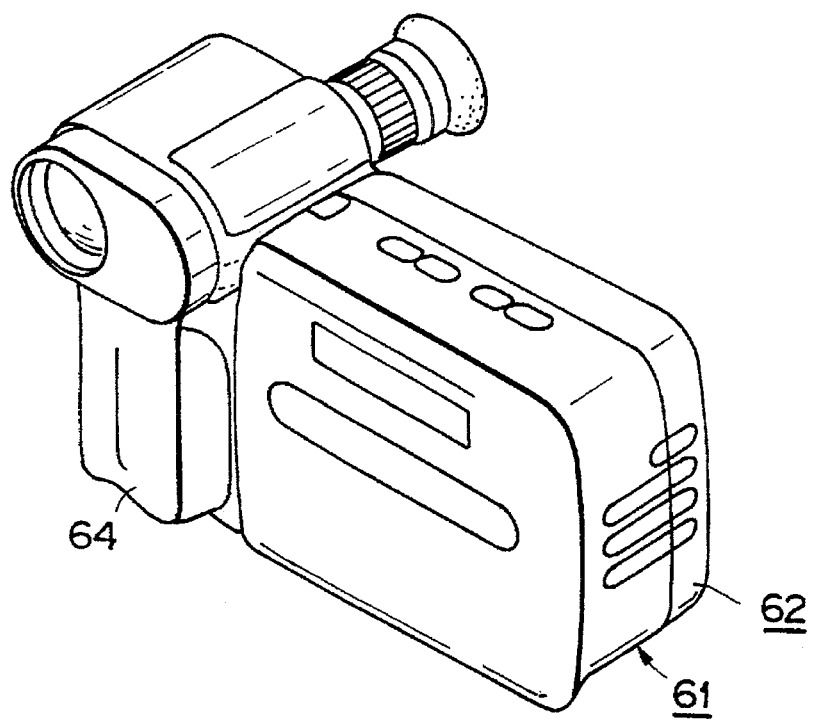
FIG. 6 is a perspective view of a video camera as an electronic equipment having a battery loading section capable of loading both the battery device according to the present invention and a first battery device housing two cells.
Figure 7:
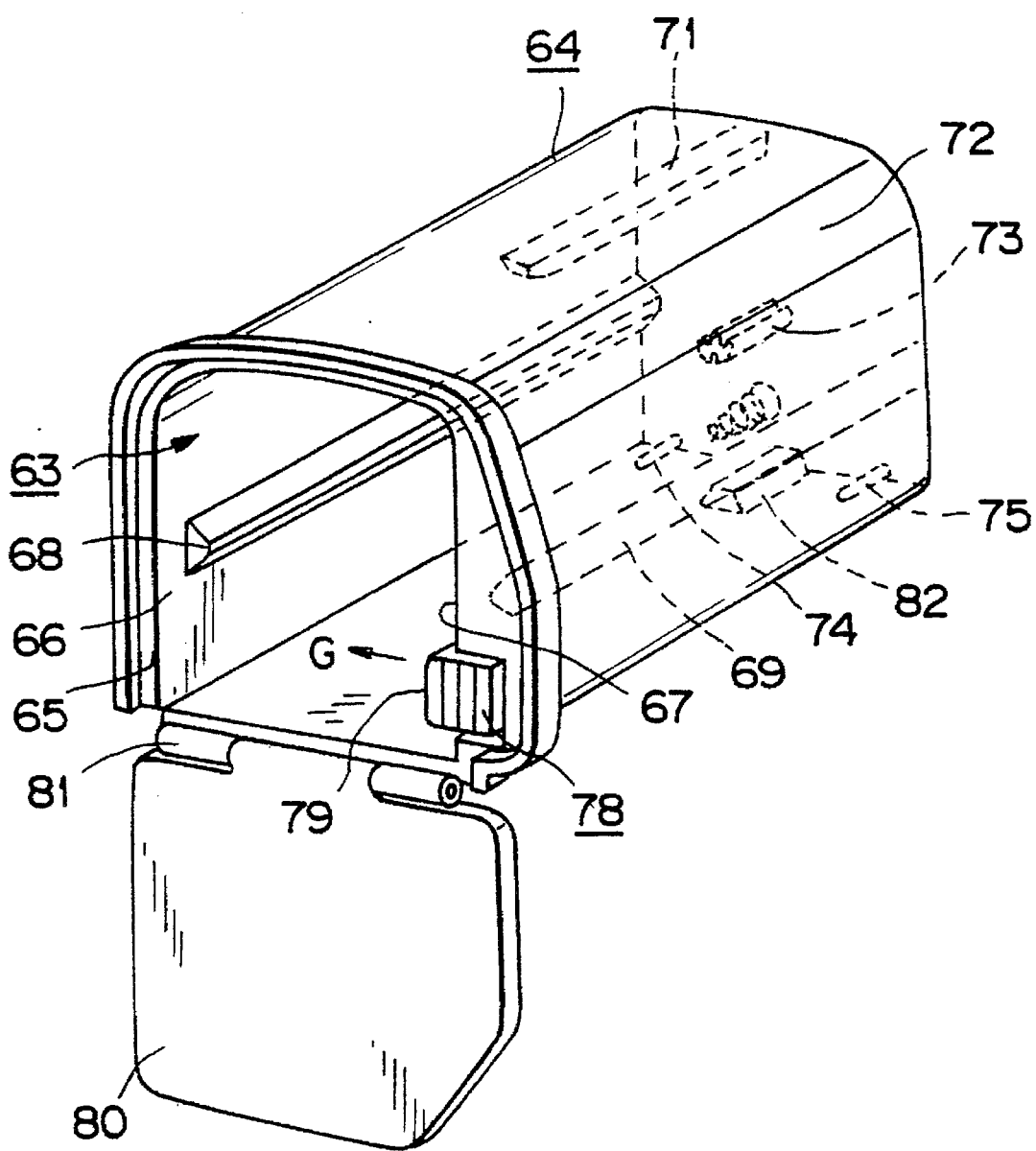
FIG. 7 is a perspective view showing a casing having a battery loading section provided on a video camera.
Figure 8:
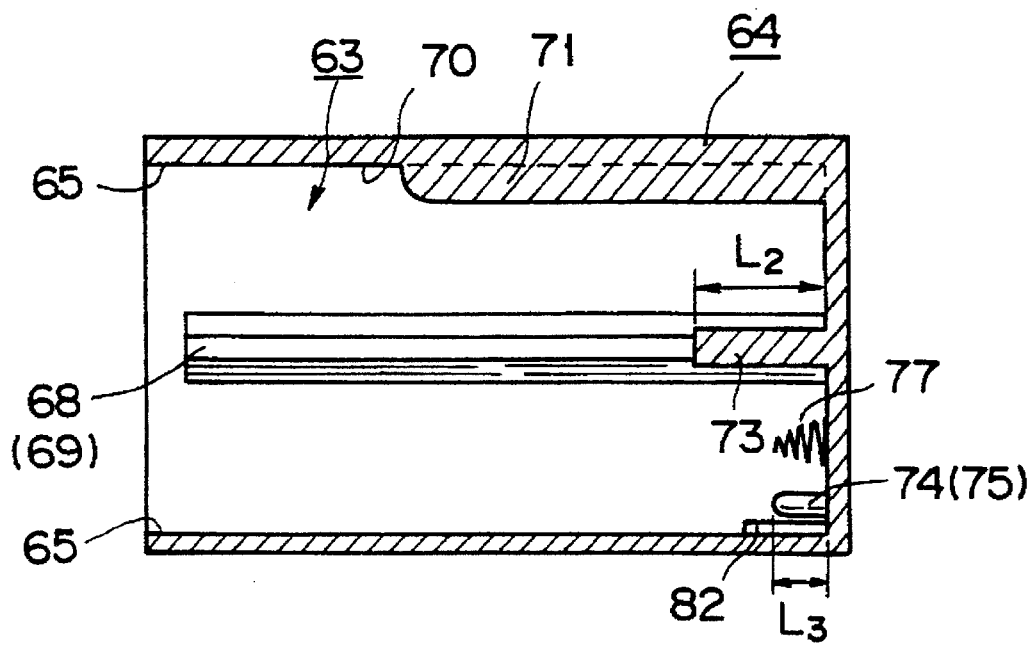
FIG. 8 is a cross-sectional view of the casing showing the battery loading section.

Turning to a video camera 61 as an electronic device on which the illustrated battery device 32 is mounted there is a battery loading section 63 in a portion 64 of an outer casing 82 constituting a main body of the video camera, as shown in FIG. 6. The battery loading section 63 is delimited by partitioning a portion of an outer casing 62 by a casing member 64. The casing member 64 constituting the battery loading section 63 has an opening 65 associated with the forward end face 41 in which the positive terminal 37 and the negative terminal 38 of the battery pack 37 are opened at 37a, 38a, respectively, as shown in FIGS. 7 and 8. The opening 65 is contoured in conformity to the forward end face 41 of the battery pack 31. The battery loading section 63 constituted within the casing 64 is sized to enclose the battery pack 31 therein, as shown in FIG. 7.

On opposite inner lateral sides 66, 67 of the battery loading section 63 are formed first and second ribs 68, 69 engaged in the first and second grooves 44, 45 formed in opposite lateral sides of the battery pack 31 loaded in the battery loading device 63. These first and second ribs 68, 69 are formed so as to be parallel to the loading direction of the battery pack 31 so that the ends of the ribs face the vicinity of the opening 65. The first and second ribs 68, 69 are of a length sufficient to be engaged in the first and second grooves 44, 45 substantially along the entire lengths thereof.

On an upper surface 70 of the battery loading section 63 extending parallel to the inserting direction of the battery pack 31 and at right angles to the opposite inner lateral sides 66, 67 of the loading section 63 there is a third rib 71 engaged in a third groove 51 formed in the upper surface of the battery pack 31. Similarly to the first and second ribs 68, 69, the third rib 71 is formed parallel to the loading direction of the battery pack 31, with the end thereof disposed in the vicinity of the opening 65, and has a length sufficient to be engaged in the third groove 51 over substantially the entire length thereof.

Figure 9:
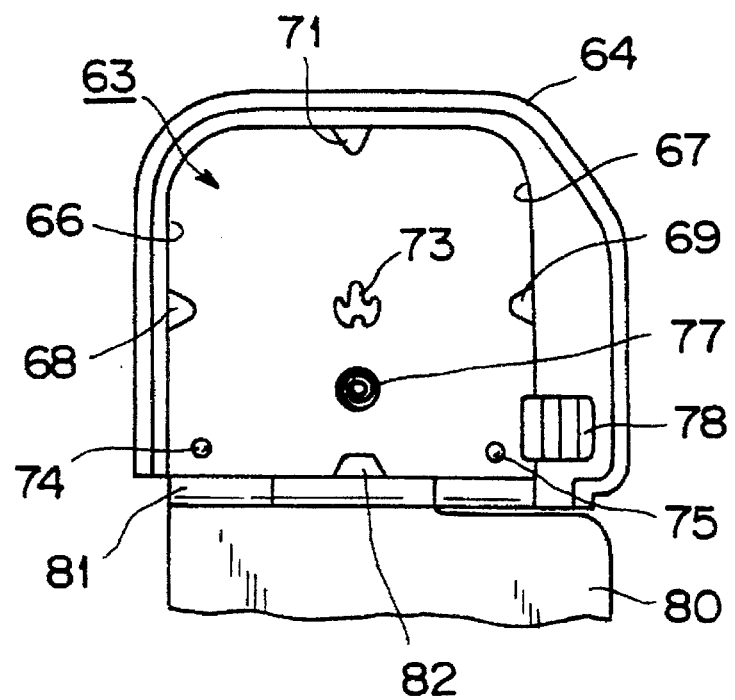
FIG. 9 is a front view of the casing showing the battery loading section.

On an inner end face 72 of the battery loading section 63 facing the inserting direction of the battery pack 31 there is an engagement boss 73 adapted to be engaged in the hole 52 formed in the forward end face 41 of the battery pack 31. The engagement boss 73 is of a cross-sectional shape corresponding to that in the hole 52 of the battery pack 31. In the present embodiment, the engagement boss 73 is formed to have a substantially triangular cross-section, as shown in FIG. 9. In addition, on the inner end face 72 of the battery loading section 63 facing the battery pack 31 being inserted are formed connection pins 74, 75 constituting connection terminals engaged by and electrically connected to the tubular positive and negative terminals 37, 38 of the battery pack 31 opened at 37a, 38a in the forward end face 41 of the battery pack 31. The engagement boss 73 has its length $L_2$ longer than the length $L_1$ of the positive and negative terminals 37, 38 of the battery pack 31 or the length $L_3$ of the connection pins 74, 75 provided on the battery loading section 63, as shown in FIG. 8. The length $L_2$ of the engagement boss 73 is 15 mm, while the length $L_3$ of the connection pins 74, 75 is 6 mm. The length $L_3$ of the connection pins 74, 75 is not limited to 6 mm if only it is lesser than the length $L_2$ of the engagement boss 73 and assures positive engagement of the connection pins 74, 75 with the positive and negative terminals 37, 38. Similarly, the length $L_2$ of the engagement boss 73 is not limited to 15 mm if it is longer than the length $L_3$ of the connection pins 74, 75.

On the rear end face 72 of the battery loading section 63 opposite to the inserting direction of the battery pack 31, there is provided an elastic member 77 for ejecting the battery pack. The elastic member 77 comprises a coil spring in which the force biasing the battery pack 31 out of the battery loading section 63 is stored. On the opening 65 of the casing 64, there is provided a lock member 78 partially protruding into the opening 65 for holding the battery pack 31 loaded in the battery loading section 63 against the bias of the elastic member 77. The lock member 78 is mounted with a spring bias in a direction shown by arrow G in FIG. 7 so that its retention portion 79 protruded at its lateral side is protruded into the opening 65 by a bias member, not shown. The lock member 79 is thrust by the battery pack 31 inserted into the battery loading section 63 so as to be moved in a direction shown by arrow G in FIG. 7 against the bias of the bias member. When the battery pack 31 is loaded in the battery loading section 63, the lock member 79 is moved under the bias of the bias member in the direction shown by arrow G in FIG. 7 for retaining a portion of the opposite side end face 46 of the battery pack 31. Thus the lock member 79 locks the battery pack 31 in the battery loading section 63.

The lock member 79 is provided at a position also capable of locking the battery pack 2 housing two cells 1 in the battery loading section 63, as explained subsequently.

For taking out the battery pack 31 loaded on the battery loading section 63, the lock member 79 is moved in the direction opposite to that shown by arrow G in FIG. 7, against the bias of this portion, for releasing the lock by the retention member 78. Thus the battery 31 is ejected via the opening 65 under the bias of the elastic member 77.

On the casing 64 is rotatably mounted a lid 80 via a hinge 81 for opening or closing the opening 65, as shown in FIG. 7. The lid 80 closes the battery loading section 63 and, when the battery pack 31 is not loaded in position, prevents intrusion of dust and dirt into the inside of the battery loading section 63. When the battery pack 31 is loaded in position, the lid prevents the battery pack 31 from being inadvertently detached from the battery loading section 63.

On the rear end face 72 of the battery loading section in the inserting direction of the battery pack 31, there is provided a movement member 82 for moving the use state display member 58 provided on the battery pack 31 loaded on the battery loading section 63.

Figure 10:
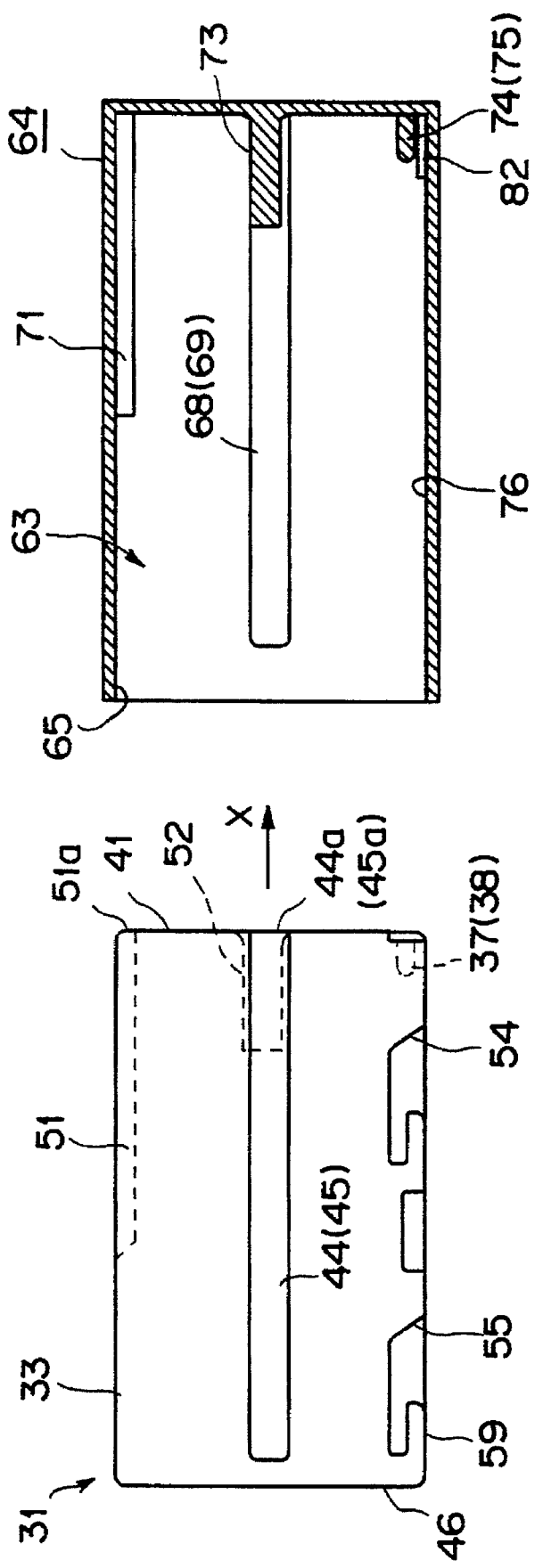
FIG. 10 is a side view showing the state of loading the battery device on the battery loading section of the video camera.

For loading the battery pack 31 on the above-described battery loading section 63, the battery pack is inserted via the entrance/exit opening 65 with the first and second grooves 44, 45 in registration with the first and second ribs 68, 69, the third groove 51 in registration with the third rib 71 and with the bottom surface 59 of the housing unit 33 lying on the bottom surface 76 within the battery loading section 63, as shown in FIG. 10. At this time, the battery pack 31 has the bottom surface 76 lying on the bottom surface 77 within the battery loading section 63. If the battery pack 31 is inserted from this position further in the direction X in FIG. 11, the first and second grooves 44, 45 are engaged by the first and second ribs 68, 69, respectively, while the third groove 51 is engaged by the third rib 71. With the first, second and the third grooves 44, 45 and 51 being engaged by the first, second and third ribs 68, 69 and 71, respectively, the battery pack 31 is properly inserted into the battery loading section 63, with the controlled position and the direction of insertion, as shown in FIG. 11.

Figure 11:
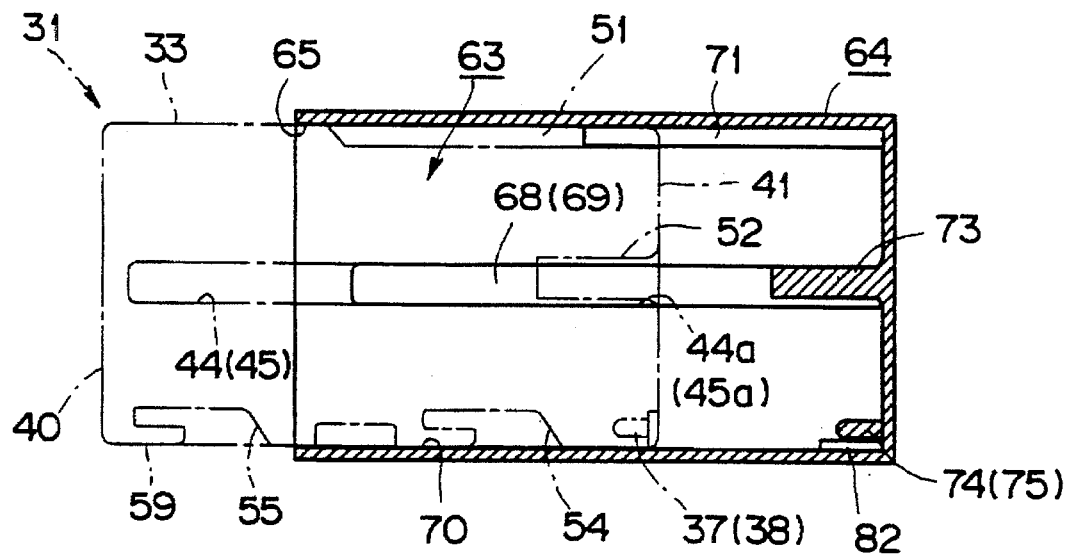
FIG. 11 is a side view showing the state in which the battery device is being loaded on the battery loading section of the video camera.
Figure 12:
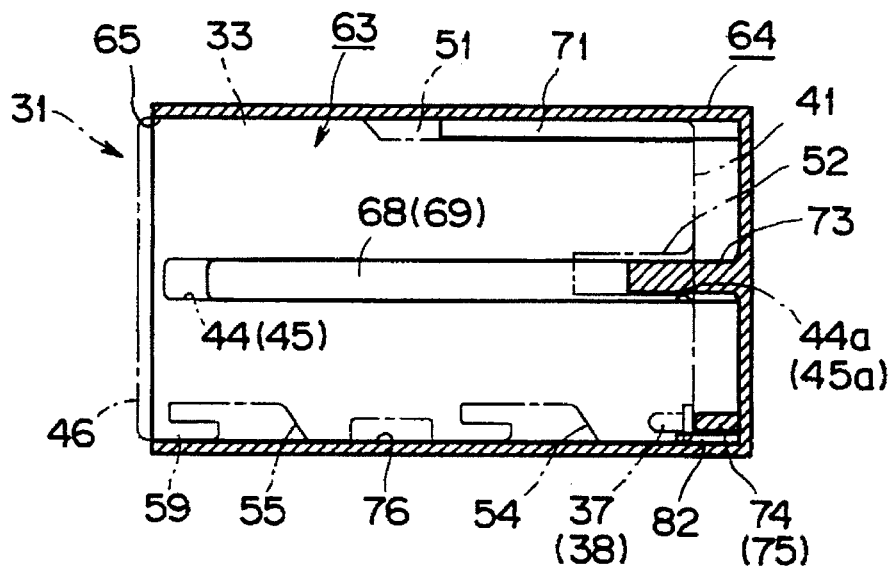
FIG. 12 is a side view showing an engagement boss of the battery loading section being engaged in an opening in the battery device.
Figure 13:
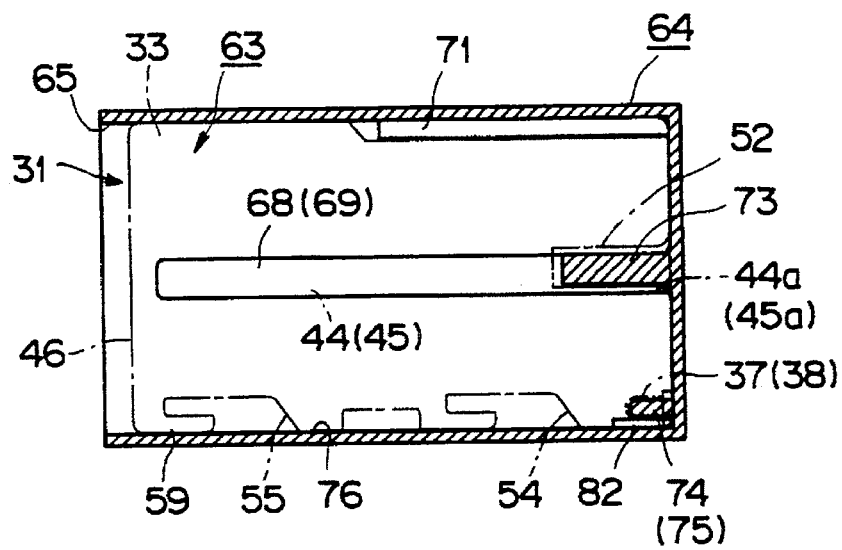
FIG. 13 is. a side view showing the battery device loaded on the battery loading section.

When the battery pack 31 is inserted in the direction shown by arrow X in FIG. 11 from the state in which the first and second grooves 44, 45 and the third groove 51 are engaged by the first and second ribs 68, 69 and the third rib 71 into the inside of the battery loading section 63, as shown by arrow X in FIG. 11, the hole 52 is engaged by the engagement boss 73, as shown in FIG. 12. When the battery pack 31 is further inserted into the inside of the battery loading section 63, as shown by arrow X in FIG. 12, the positive terminal 87 and the negative terminal 38 are engaged with the connection pins 74, 75, as shown in FIG. 13. This completes loading of the battery pack in the battery loading section 63 to establish electrical connection with the video camera device 61 to enable the current to be supplied to the video camera 61.

In the course of the loading of the battery pack 31 in the battery loading device 63, the elastic member 77 for ejecting the battery is compressed, although not shown, for storing the force in the direction of ejecting the battery pack from the battery loading section 63.

The battery pack 31 loaded on the battery loading section 63 is locked therein by a portion of the rear end face 46 being retained by the retention portion 78 of the lock member 79. When the battery pack 31 is loaded in the battery loading section 63, the use state display section 58 is moved by the movement member 82 for indicating that the battery pack has once been loaded and used in the video camera 61.

The battery pack 31 thus loaded in the battery loading section 63 is supported by the first and second grooves 44, 45 on its both sides being engaged by the first and second ribs 68, 69, so that it is prevented from moving within the battery loading section 63 and is loaded in stability. Above all, since the battery pack 31 increased in weight by holding four cells 1, the video camera 61 is prevented from being damaged by the wobbling of the battery pack 31 even though a shock is applied to the video camera 61 having the battery pack 31 loaded therein.

On the other hand, since the engagement boss 73 engaged in the hole 52 of the battery device 31 is longer in length than the length $L_3$ of the positive terminal 87 or the negative terminal 38 or the length $L_4$ of the connection pins 74, 75, the engagement between the positive and negative terminals 37, 38 with the connection pins 74, 75 occurs after the first and second grooves 44, 45 are engaged by the first and second ribs 68, 69 and the hole 52 is engaged by the engagement boss 73 for positioning the battery pack 31 with respect to the battery loading section 63. Thus the positive and negative terminals 37, 38 may be correctly engaged with the connection pins 74, 75, while protection may be made of the positive and negative terminals 37, 38 and the connection pins 74, 75.

The battery pack 31 is inserted into the battery loading section 63 with the hole 52 being engaged by the engagement boss 73, so that the battery pack 31 may be loaded in the battery loading section 63 without producing forced sliding contact of the outer peripheral surface of the housing unit 33 with the inner peripheral surface of the battery loading section 63. Thus it is possible to prevent the outer peripheral surface of the housing unit 63 from being scratched or rubbed by repeated insertion and removal of the battery pack 31 into and out of the battery loading section 63. Since the hole 52 has its depth $D_1$ deeper than the radius $R_1$ of the opening end 52a, as explained previously, it becomes possible to increase the length of the engagement boss 73 provided on the battery loading section 63 for being engaged with the hole 52 for improving the guide function during loading of the battery pack 31 in the battery loading section 63.

If an attempt is made to insert the battery pack 31 into the above-described battery loading section 63, in a vertically topsy-turvied condition, the third groove 51 is not coincident with the third rib 71, with the foremost part of the third rib 71 being caused to bear against the end face 41 of the battery device 31 for preventing mistaken insertion of the battery device.

Figure 14:
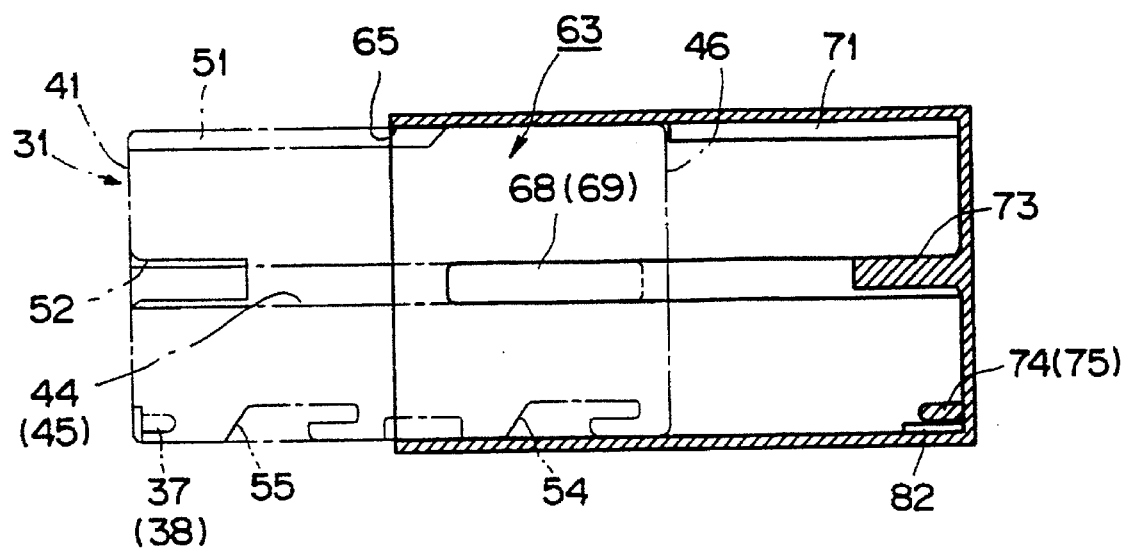
FIG. 14 is a side view showing the battery pack loaded on the battery loading section in a mistaken manner.

If an attempt is made to insert the battery pack 31 into the battery loading section 63 backward with the rear end face 46 opposite to the forward end face 41, the end faces of the first and second ribs 68, 69 or the third rib 71 are caused to bear against the rear end face 46 as shown in FIG. 14, thereby preventing insertion of the battery pack into the loading section 63. Thus, since the sides of the first, second and third grooves 44, 45, 51 towards the end face 46 are closed, the first, second and third grooves 44, 45, 51 along with the first, second and third ribs 68, 69 and 71 constitute a mechanism for preventing insertion of the battery pack in an improper orientation.

If an attempt is made to insert the battery pack 31, with the rear end face 46 as the inserting end, with the battery loading casing 64 forcibly spread apart, the engagement boss 73 is caused to bear against the opposite end face 46 for inhibiting further insertion of the battery pack into the battery loading section 63.

Figure 15:
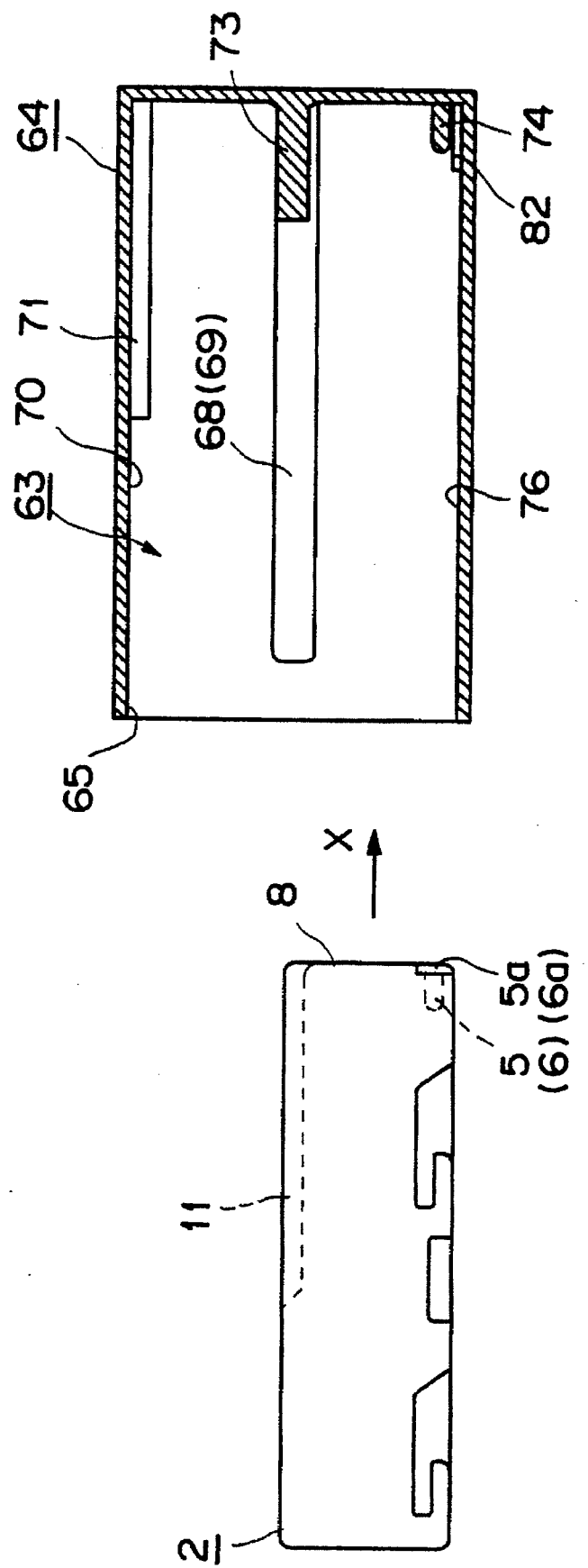
FIG. 15 is a side view showing the state in which a first battery device housing two cells being loaded on the battery loading section.
Figure 16:
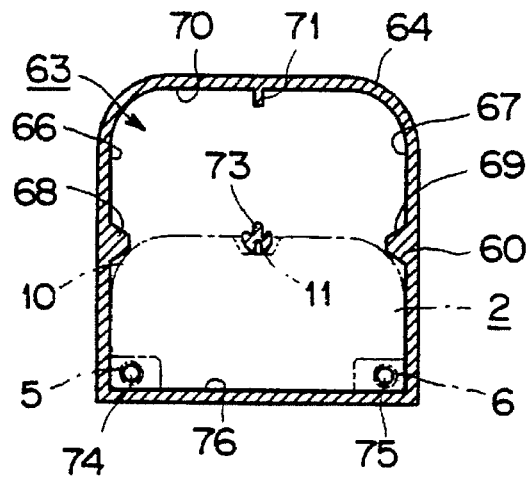
FIG. 16 is a front view showing the state in which the first battery device is being loaded on the battery loading section.
Figure 17:
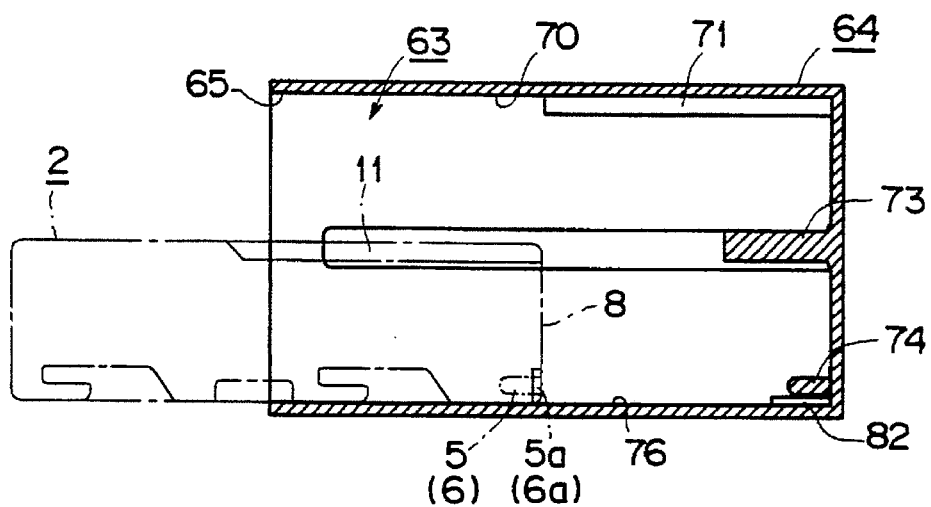
FIG. 17 is a side view showing the state in which the first battery device is being loaded on the battery loading section.
Figure 18:
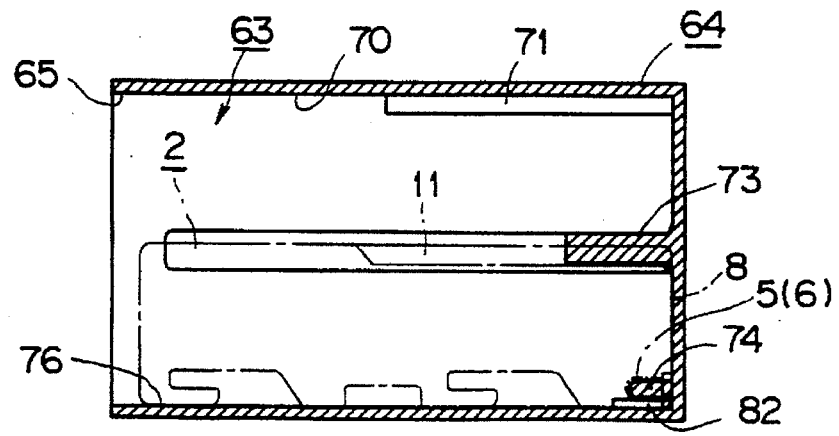
FIG. 18 is a side view showing the state in which the first battery device has been loaded on the battery loading section.

The invention also prevent improper insertion into the battery loading section 63 of the first battery pack 2, housing only two cells 1, 1 arranged side-by-side, The first battery pack 2, is inserted in such a manner that the forward end face 8 of the battery pack 2, in which the positive and negative terminals 5 and 6 are exposed at 5a and 6a, is caused to face the opening 65, and the bottom side of the battery pack is caused to slide on the bottom surface 76 within the battery loading section 63, as shown in FIG. 15. The battery pack is inserted in the direction indicated by arrow X in FIG. 17 in such a manner than the arcuate portions 10, 10 formed on both sides of the upper surface 9 of the first battery pack 2 are supported in abutment contact with the lower edges of the first and second ribs 68, 69 formed on both lateral sides 66, 67 of the battery loading section 63 for preventing the first battery pack 2 from leaving the bottom surface 76 of the battery loading section 63, as shown in FIG. 16. As the first battery pack 2 is further inserted onto the battery loading section 63, the engagement boss 63 is engaged with the grove 11 formed in the upper surface 9. By the first battery pack 2 abutting the first and second ribs 68, 69 and by the engagement boss 73 being engaged in the groove 11, the first battery pack 2 is loaded in the battery loading section 63 in a proper loaded position on the bottom surface 76 of the battery loading section 63. When the first battery pack 2 is further inserted in the direction indicated by arrow X in FIG. 18, from the state in which the engagement boss 73 is engaged in the groove 11, the positive and negative terminals 5, 6 are engaged with the connection pins 74, 75. Since the first battery pack 2 is loaded within the battery loading section 63 by being held in position by the first and second ribs 68, 69 and the engagement boss 73, it becomes possible to establish the engagement of the positive and negative terminals 5 and 6 with the connection pins 74, 75, thereby assuring protection of the positive terminal 37 and the negative terminal 38 and the connection pins 74, 75.

Figure 19:
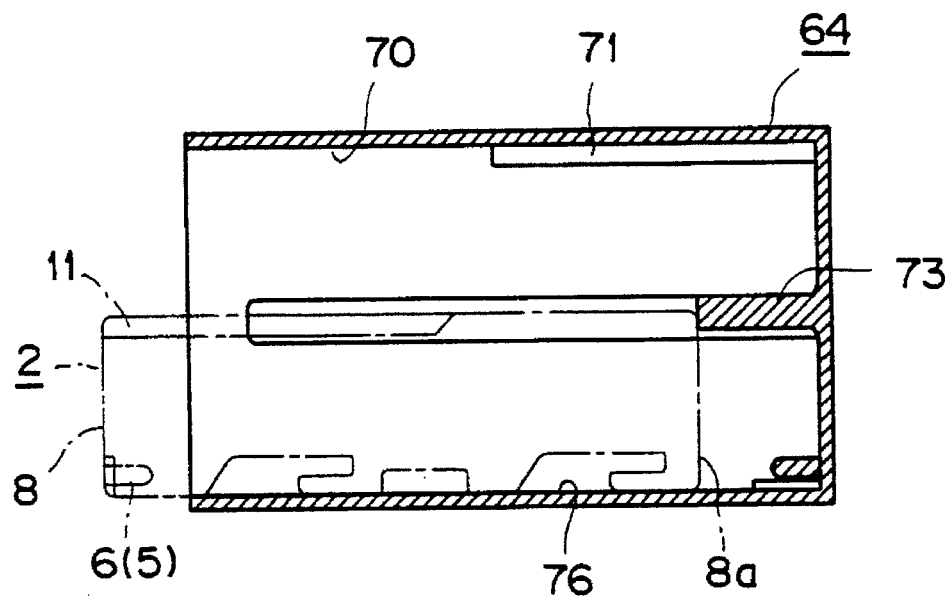
FIG. 19 is a side view showing the state in which the first battery device has been loaded on the battery loading section in the reverse direction.
Figure 20:
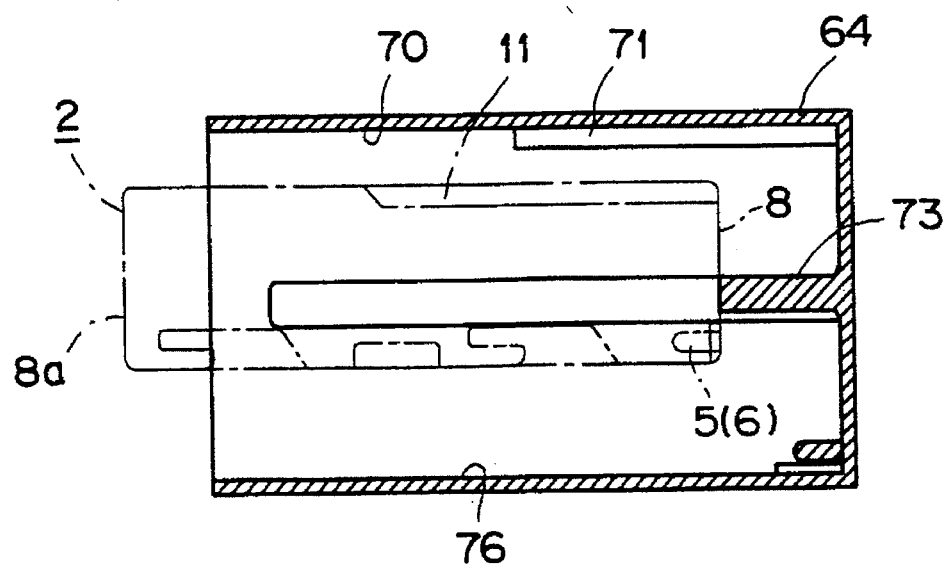
FIG. 20 is a side view showing the state in which the first battery device has been loaded on the battery loading section at an incorrect inserting position.

When the first battery pack 2 is inserted as shown in FIG. 19 with the planar end face 8a opposite to the end face 8 of the battery pack 2 in which the groove 11 is opened, as the inserting end, the distal end face of the engagement boss 73 is caused to bear against a portion of the end face 8a to inhibit mistaken insertion.

If the first battery pack 2 is inserted with the forward end face 8, forward but at a distance above the bottom surface 76 towards the upper surface 70 of the battery loading section 63, the first battery pack is caused to bear against the end face of the engagement boss 73 to prevent mistaken insertion of the first battery pack 2.

Figure 21:
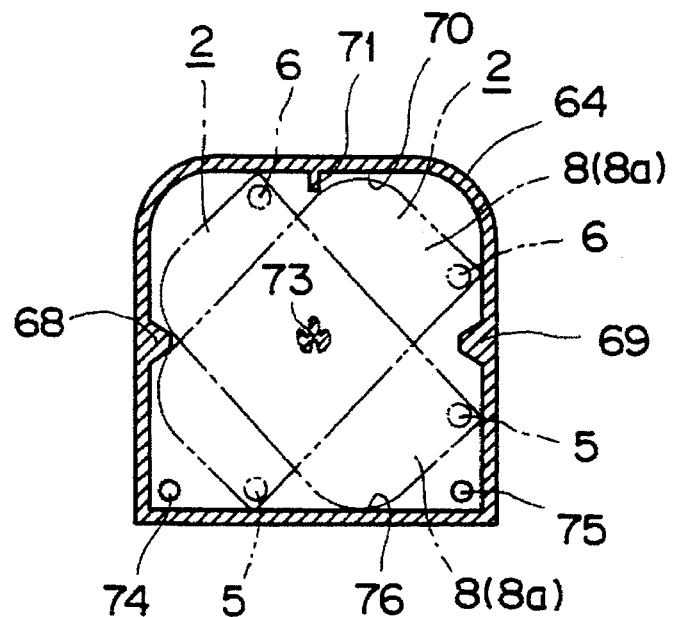
FIG. 21 is a front view showing the state in which the first battery device has been loaded on the battery loading section at an incorrect inserting position.
Figure 22:
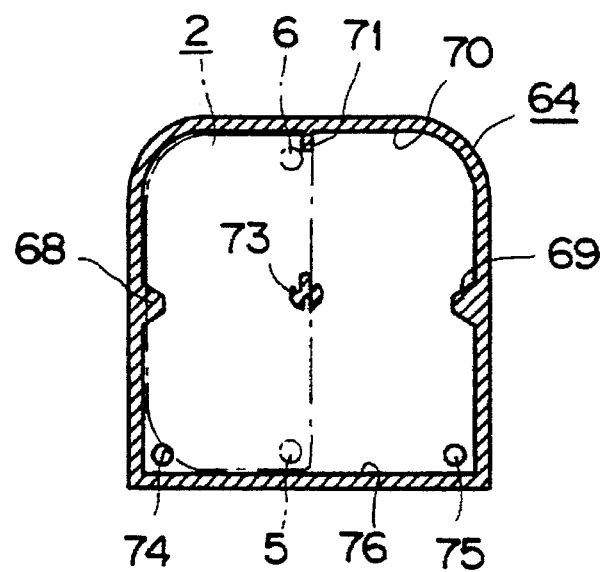
FIG. 22 is a front view showing the state in which the first battery device has been inserted with deviation towards an upper side of the battery loading section.

If the first battery pack 2 is angle at an inclined along the diagonal line of the battery loading section 63, as shown in FIG. 21, part of the forward end face 8 or the rear end face 8a of the battery pack is caused to bear against the end face of the engagement boss 73, thereby inhibiting mistaken insertion of the first battery pack 2.

If the first battery pack 2 is inserted in a direction normal to the battery loading section 63, that is along one of the inner lateral surfaces 66, 67, such as the inner lateral surface 66, part of the forward end face 8 or the rear end face 8a of the battery pack is caused to bear against the end face of the first and second ribs 68, 69 or the end face of the engagement boss 73 thereby inhibiting mistaken insertion of the first battery pack 2.

Figure 23:
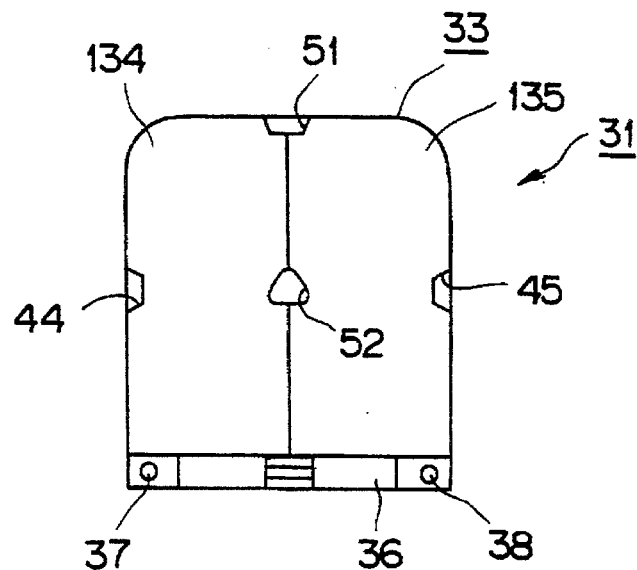
FIG. 23 is a front view showing a modification of the battery device according to the present invention.
Figure 24:
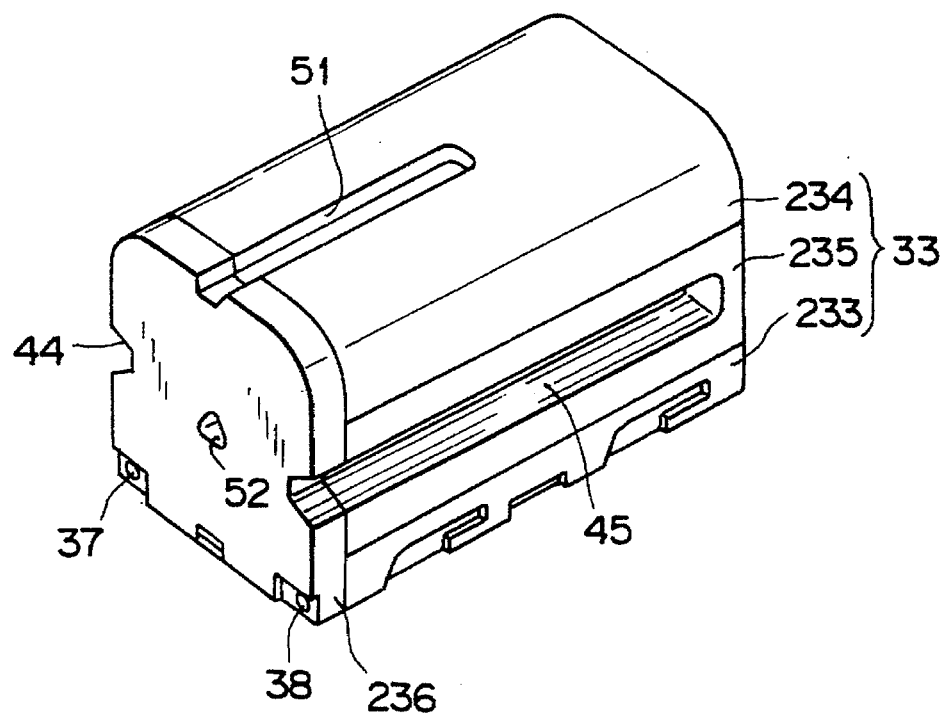
FIGS. 24 and 25 are perspective views showing other modifications according to the present invention, respectively.

The housing unit 33 of the battery pack 31 in the above-described embodiment is constituted by stacking the mid casing half 35 and the upper casing half 34 on the terminal mounting plate 36. However, a pair of vertically partitioned casing halves 134, 135 may be provided on the terminal mounting plate 36 and abutted and bonded to each other, as shown in FIG. 23. The housing unit 33 may also be formed by abutting and connecting the lower casing half 233, a mid casing half 235 and an upper casing half 234 to one another and integrally attaching a terminal mounting plate 236 having the positive terminal 37 and the negative terminal 38 embedded therein to one end face of the resulting unit 33, as shown in FIG. 24. In these cases, the first and second grooves 44, 45 and the third groove 51 as well as the hole 52 are provided as in the base of the battery pack 31.

The housing unit 33 may be integrally molded from the upper casing half 34, mid casing half 35 and the terminal mounting plate 36, in which case the cell 1 is insert-molded in the molding metal die and housed in the housing unit 33 simultaneously with the molding of the housing unit 33.

Figure 25:
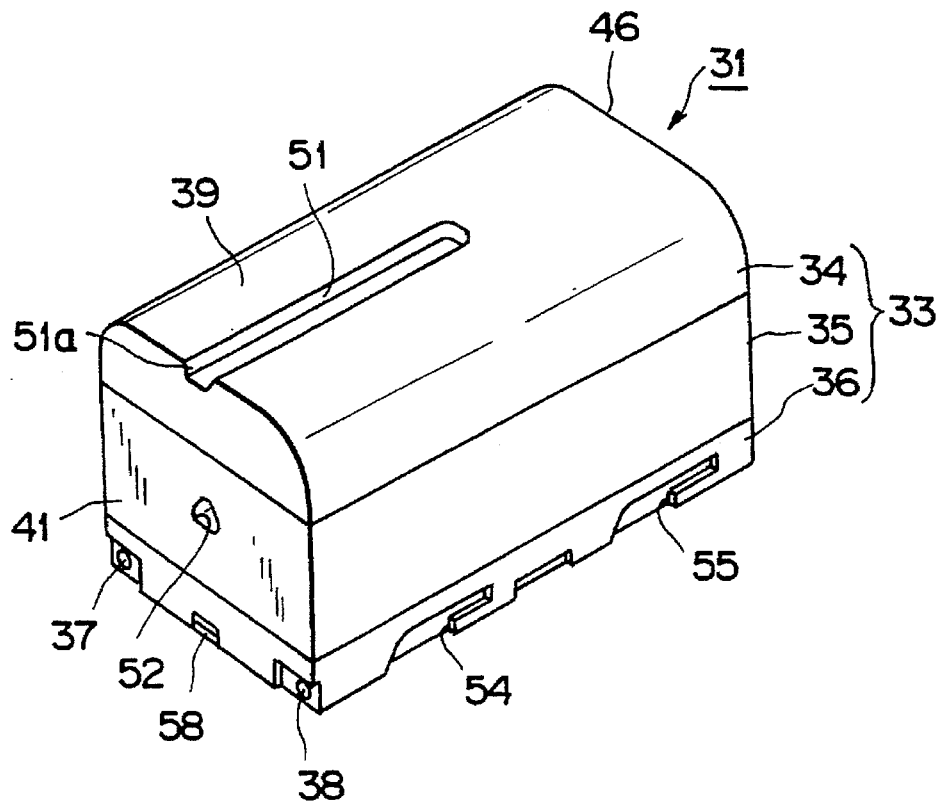
Figure 26:
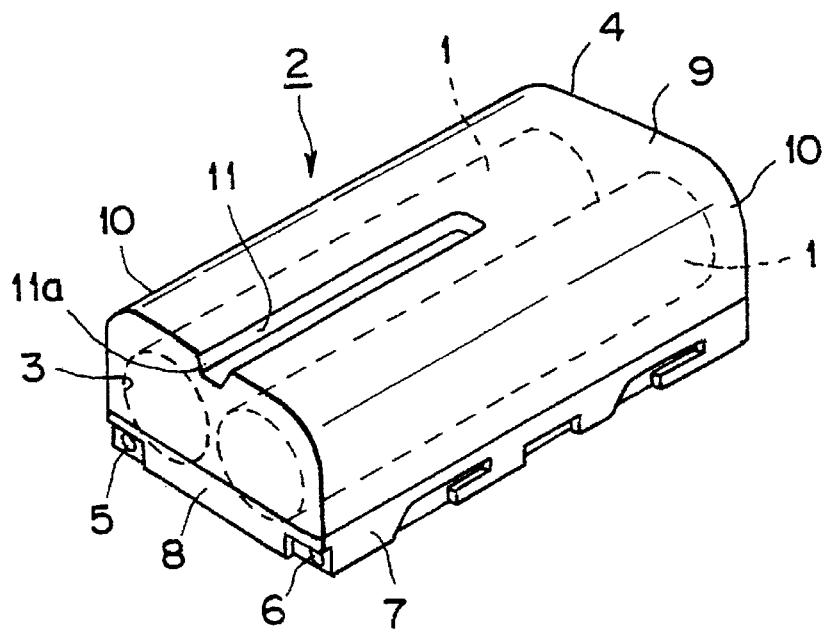
FIG. 26 is a perspective view showing the first battery housing two cells.
Figure 27:
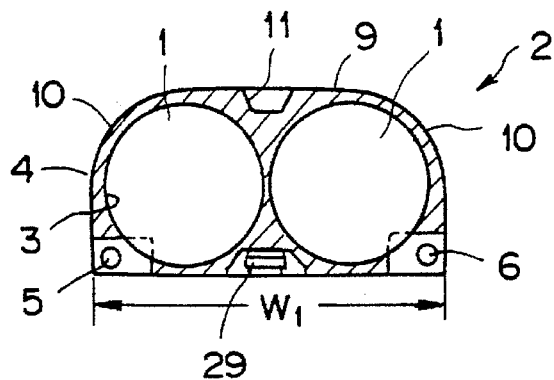
FIG. 27 is a transverse cross-sectional view showing the first battery shown in FIG. 26.
Figure 28:
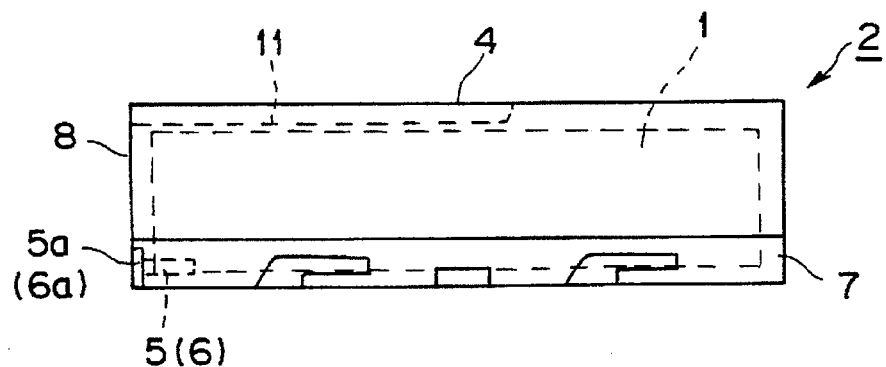
FIG. 28 is a side view showing the first battery shown in FIG. 26.
Figure 29:
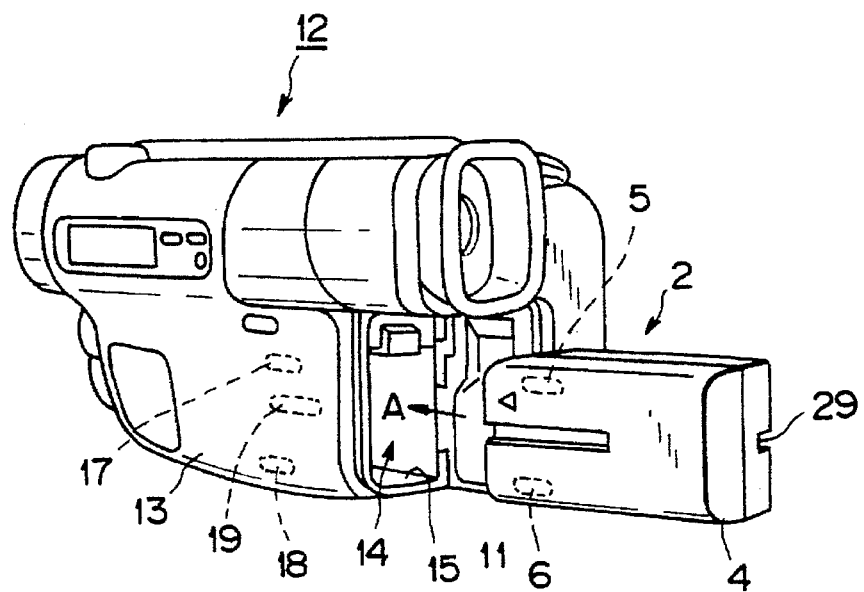
FIG. 29 is a perspective view of a video camera having a battery loading section on which the first battery device shown in FIG. 26 is loaded.
Figure 30:
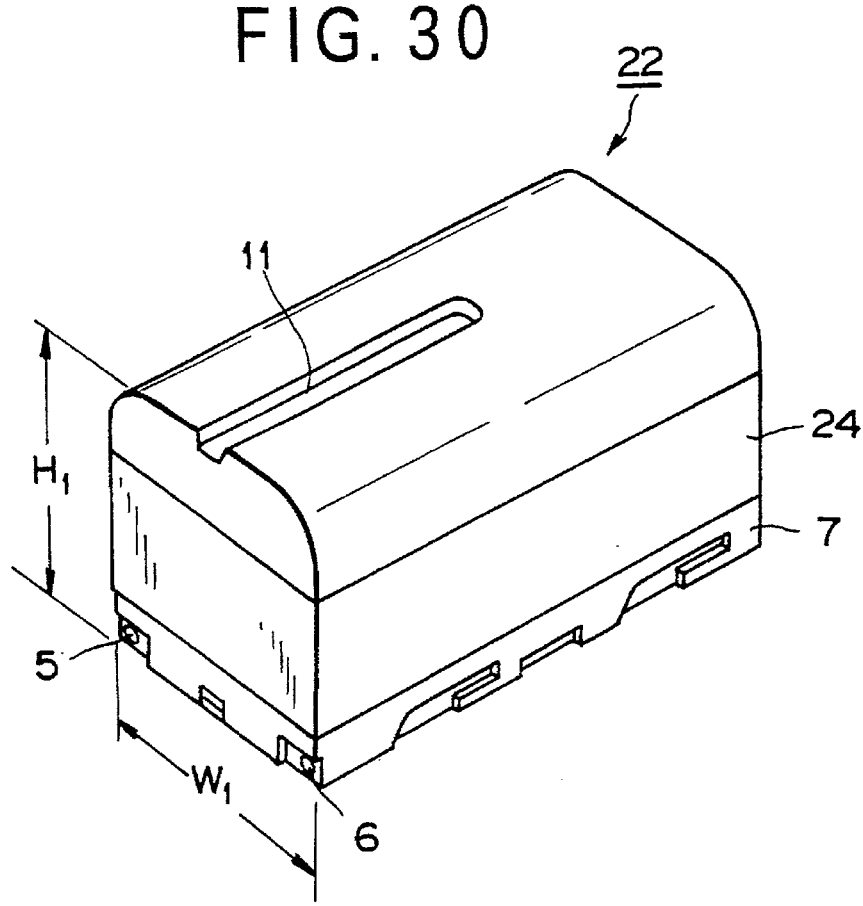
FIG. 30 is a perspective view showing a second battery device housing four cells.
Figure 31:
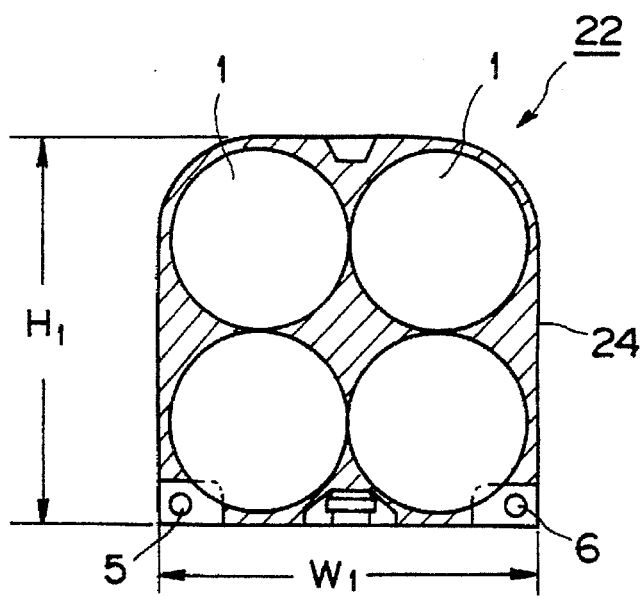
FIG. 31 is a transverse cross-sectional view showing the second battery device shown in FIG. 30.
Figure 32:
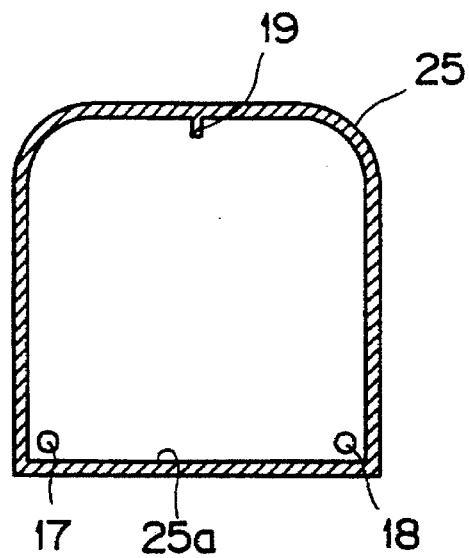
FIG. 32 is a transverse cross-sectional view showing the second battery section on which the second battery device is loaded.
Figure 33:
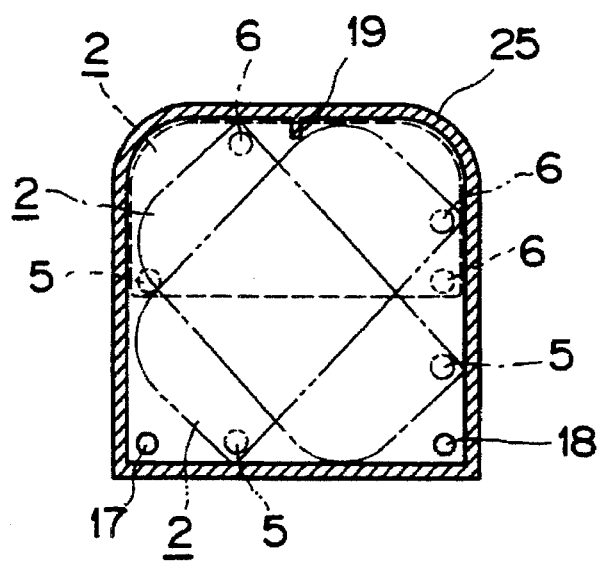
FIG. 33 is a transverse cross-sectional view showing the state in which the first battery device has been loaded on the battery loading section on which the second battery device is loaded.

If it is intended only to prevent the battery pack 31 and the first battery pack 2 from being inserted in a mistaken manner into the battery loading unit 63, there is no necessity of providing the first and second grooves 44, 45, as shown in FIG. 25, since the mistaken insertion can be prevented by the hole 52 and the engagement boss 73.

If it is intended to prevent mistaken insertion of the battery pack into the battery loading section enabling the loading only of the sole battery pack by the hole 52 and the engagement boss 73, the battery pack may house two or four or more cells 1, without being limited to the device housing four cells.

What is claimed is:

1. A battery pack comprising a housing unit having a cell housing unit, a plurality of cells housed within said cell housing unit, and first and second grooves formed on both lateral surfaces of the cell housing unit extending parallel to the direction of insertion of the housing unit into an electronic device, wherein said first and second grooves extend into a forward end face of the cell housing unit in the direction of insertion, wherein said first and second grooves do not extend into a rear end face of the cell housing unit.

2. The battery pack as claimed in claim 1 wherein connection terminals electrically connected to connection terminals provided on the electronic device are provided on the forward end face of the housing unit in the direction of insertion into the electronic device.

3. The battery pack as claimed in claim 1 further comprising connection terminals electrically connected to connection terminals provided on the electronic equipment.

4. A battery pack comprising a housing unit having a cell housing unit, a plurality of cells housed within said cell housing unit, first and second grooves formed on both lateral surfaces of the cell housing unit extending parallel to the direction of insertion of the housing unit into an electronic device, wherein said first and second grooves extend into a forward end face of the cell housing unit in the direction of insertion, and a third groove in said cell housing unit extending parallel to said first and second grooves, wherein said third groove extends into said forward end face of the housing unit.

5. The battery pack as claimed in claim 4 wherein the first, second and third grooves are formed in spaces defined in the cell housing unit between the cells.

6. The battery pack as claimed in claim 4 wherein the hole is substantially triangular in cross-section.

7. The battery pack as claimed in claim 4 wherein the hole has a maximum length in the cross-sectional direction smaller than its depth.

8. The battery pack as claimed in claim 4 wherein connection terminals electrically connected to connection terminals provided on the electronic device are provided on the forward end face of the housing unit in the direction of insertion into the electronic device.

9. A battery pack comprising a housing unit having a cell housing unit, a plurality of cells housed within said cell housing unit, and first and second grooves formed on both lateral surfaces of the cell housing unit extending parallel to the direction of insertion of the housing unit into an electronic device, wherein said first and second grooves extend into a forward end face of the cell housing unit in the direction of insertion, wherein a hole is formed in a portion of the forward end face of the housing unit along the direction of insertion not faced by the end faces of the cells housed within the housing unit.

10. The battery pack as claimed in claim 9 wherein the cell housing unit is dimensioned to hold four tubular cells in juxtaposition and parallel to each other in vertical and transverse directions, said hole being formed at a position between cells housed in juxtaposition parallel to each other in the cell housing unit.

11. The battery pack as claimed in claim 9 wherein connection terminals electrically connected to connection terminals provided on the electronic device are provided on the forward end face of the housing unit in the direction of insertion into the electronic device.

12. A battery pack comprising a housing unit having a cell housing unit, a plurality of cells housed within said cell housing unit, and first and second grooves formed on both lateral surfaces of the cell housing unit extending parallel to the direction of insertion of the housing unit into an electronic device, wherein said first and second grooves extend into a forward end face of the cell housing unit in the direction of insertion, and wherein the cell housing unit is dimensioned to hold four tubular cells in juxtaposition in parallel in vertical and transverse directions.

13. The battery pack as claimed in claim 12 wherein the first and second grooves are formed in spaces defined in the cell housing unit between the cells arranged in juxtaposition and parallel to each other.

14. The battery pack as claimed in claim 12 wherein connection terminals electrically connected to connection terminals provided on the electronic device are provided on the forward end face of the housing unit in the direction of insertion into the electronic device.

15. An electronic device comprising:

a main body of the electronic device;

a casing which includes a battery loading section dimensioned to hold a battery pack which has first and second grooves on opposite lateral surfaces thereof extending parallel to the direction of insertion of the battery pack into the battery loading section;

first and second ribs on opposite inner lateral sides of the battery loading section for engaging the first and second grooves of the battery pack; and a third rib formed on a surface of the battery loading section extending parallel with the first and second ribs for engaging a third groove formed in a surface of the housing unit of the battery pack.

16. The electronic equipment as claimed in claim 15 wherein connection terminals electrically connected to connection terminals provided on a forward end face of the battery pack are provided on an end face of the battery loading section along the direction of insertion of the battery pack.

17. The electronic device as claimed in claim 16 wherein the connection terminals provided on the battery pack and the battery loading device are, respectively, connection pins and tubular connection terminals engaged by the connection pins.

18. An electronic device comprising:

a main body of the electronic device;

a casing which includes a battery loading section dimensioned to hold a battery pack which has first and second grooves on opposite lateral surfaces thereof extending parallel to the direction of insertion of the battery pack into the battery loading section;

first and second ribs on opposite inner lateral sides of the battery loading section for engagement by the first and second grooves of the battery pack; and an engagement boss for engaging a hole formed in a forward end face of the battery pack is formed on an end face of the battery loading section lying in the inserting direction of the battery pack.

19. The electronic equipment as claimed in claim 18 wherein the engagement boss engaged in the hole formed in the battery pack is longer in length than connection pins or tubular connection terminals provided in the battery pack or in the battery loading section.

\* \* \* \* \*